United States Patent [19]

Doyel

[11] 3,927,608
[45] Dec. 23, 1975

[54] BEVERAGE MAKING DEVICE

[76] Inventor: John S. Doyel, 404 W. 20th St., New York, N.Y. 10011

[22] Filed: June 14, 1974
[21] Appl. No.: 479,521

[52] U.S. Cl. .................... 99/297; 99/287; 99/298
[51] Int. Cl.² ................... A47J 31/38; A47J 31/06
[58] Field of Search ............ 99/279, 297, 298, 316, 99/287

[56] References Cited
UNITED STATES PATENTS

| | | | |
|---|---|---|---|
| 376,319 | 1/1888 | Lane | 99/297 |
| 2,285,930 | 6/1942 | Kahan | 99/287 |
| 2,935,928 | 5/1960 | Keating et al. | 99/297 |
| 3,137,228 | 6/1964 | Elow | 99/287 |

FOREIGN PATENTS OR APPLICATIONS

| | | | |
|---|---|---|---|
| 671,895 | 5/1952 | United Kingdom | 99/287 |
| 650,328 | 7/1936 | Germany | 99/297 |

*Primary Examiner*—Richard E. Aegerter
*Assistant Examiner*—Richard R. Stearns
*Attorney, Agent, or Firm*—Cooper, Dunham, Clark Griffin & Moran

[57] ABSTRACT

Solid particles, such as coffee grounds or tea, are filtered from a mixture with a liquid infusion in an open top, tubular container with a piston moving axially within the container and having piston rings which extend toward the container and allow the flow of liquid between the container and the rings but keep the solid particles ahead of the piston movement. The rings are serrated, like a coin, or scalloped or notched, to facilitate liquid flow between the rings and the container. The container is slightly tapered, to be narrower at the bottom, and the rings are C-shpaed and resilient, to contract as the piston goes down toward the bottom of the container. The places where the rings are slit are diametrically opposite each other, and a projection from one extends into the slit of the other, to prevent relative rotation between the two rings that may bring the slits into alignment.

20 Claims, 11 Drawing Figures

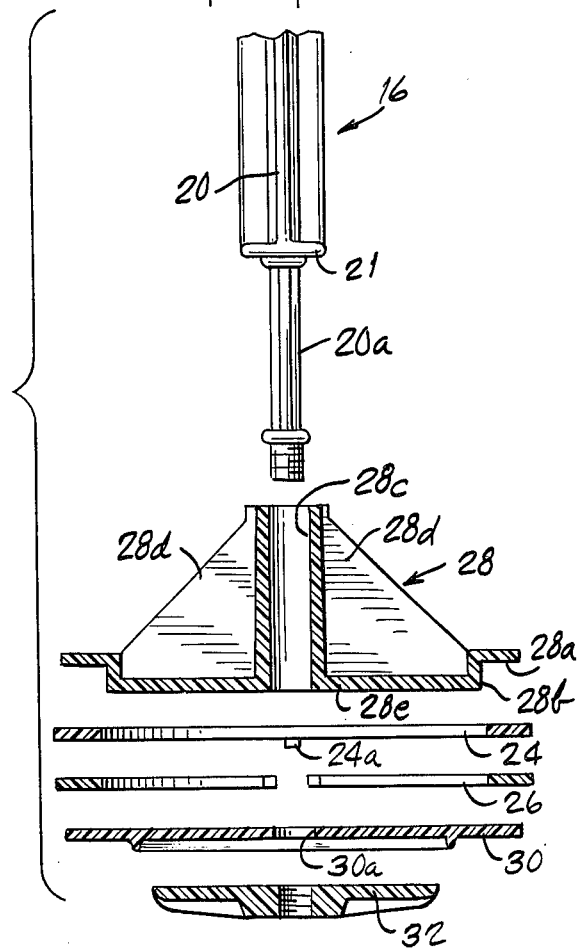
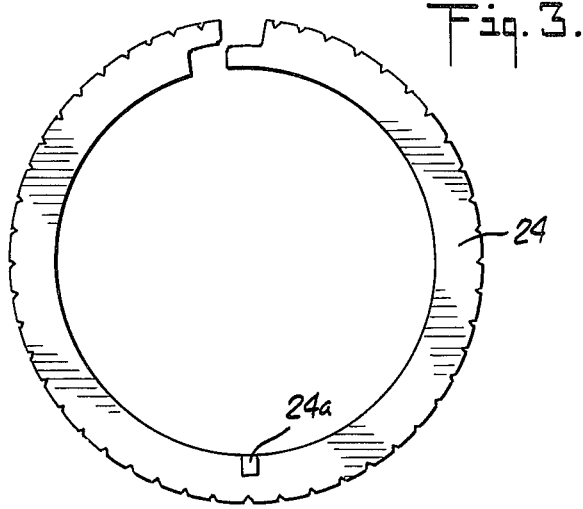
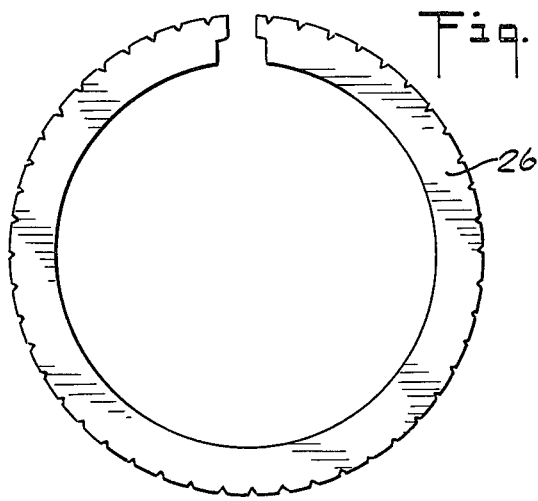
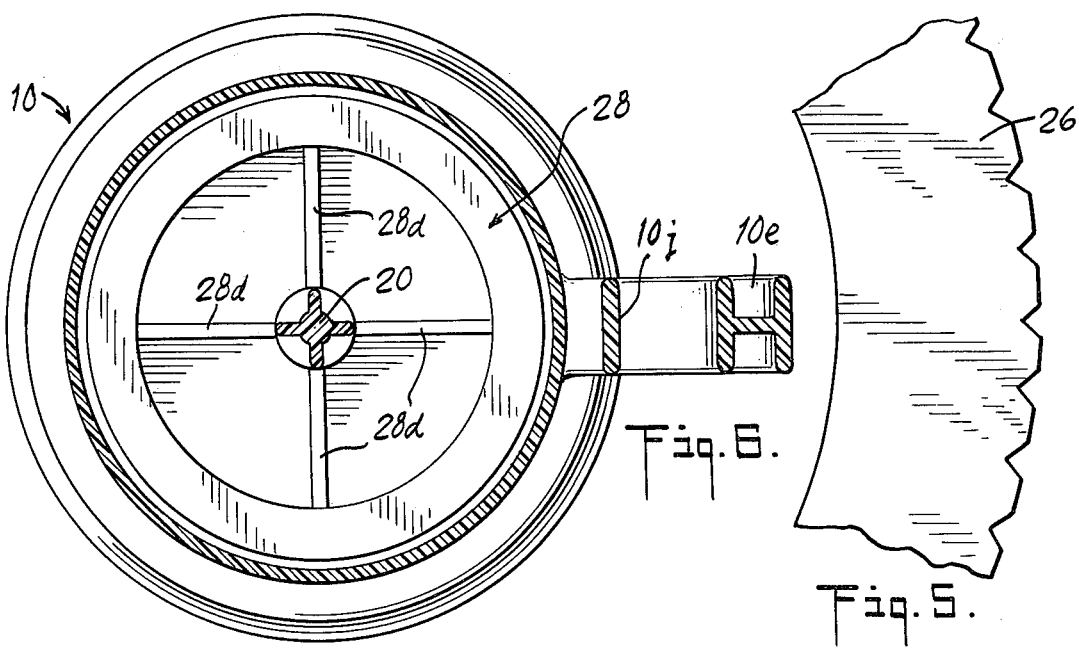

BEVERAGE MAKING DEVICE

BACKGROUND OF THE INVENTION

The invention relates to beverage making devices, e.g., coffee and tea makers, of the type having an axially moveable plunger for filtering particulate material from a liquid.

Known beverage making devices of this type typically employ a wire mesh or screen filter axially moveable inside a container to separate the particulate material from the liquid, and use a sealing ring to seal the plunger against the container walls. As the plunger moves axially in the container, the liquid flow is through the wire mesh or screen, and not between the inner wall of the container and the plunger. Examples of such prior art devices are described in Keatings et al. U.S. Pat. No. 2,935,928 and Elow U.S. Pat. No. 3,137,228. A disadvantage of prior art devices of this type is that the wire mesh or screen is relatively expensive and relatively difficult to keep clean and free of clogging. Additional disadvantages result from the difficulty and expense involved in obtaining a good seal between the plunger and the container wall.

In a different type of a prior art device, exemplified by Schlumbohm U.S. Pat. No. 2,330,012, a loosely fitting solid spherical plunger moves within a tubular container to keep ice cubes below the plunger. Since both the container and the plunger are solid and not resilient, either the clearance between the plunger and the container has to be relatively great, to prevent binding, or the container and the plunger must be manufactured to close tolerances to allow for a small clearance. Thus, no inexpensive device of this type can be used to filter relatively small particles, such as coffee grounds.

SUMMARY OF THE INVENTION

An object of the invention is to provide a beverage making device which is simple and inexpensive, and which does not have the disadvantages of the prior art devices discussed above. Specifically, an object of the invention is to provide a beverage making device which requires no precision parts, so that it is inexpensive, which is not subject to clogging, and which can be easily cleaned.

An exemplary embodiment of the invention comprises an open top, tubular container for a mixture of a solid particulate material and a liquid, and a plunger moveable axially in it. The top end of the plunger has a handle and the bottom end of the plunger has a piston having a pair of radially outwardly extending, coaxial rings which loosely fit the container, leaving a clearance between the container and the rings which is generally sufficient for liquid flow but is insufficient for particle flow. A single ring, or more than two rings can be used instead of a pair of rings. The outer circumferential edge of the rings may be serrated, scalloped, or notched to facilitate liquid flow between the rings and the container. The rings are held coaxially and adjacent each other within an annular, outwardly facing channel formed by a pair of circular plates axially flanking the rings. The axial fit between the rings and the plates allows the rings to move radially within this annular channel, but does not allow particle flow between the rings and the plates. The rings may be C-shaped, in which case the discontinuities where the two rings are slit are circumferentially spaced, so that the solid part of one ring prevents particle flow through the discontinuity of the other ring. A projection extends axially from one ring into the discontinuity of the other, to prevent relative rotation between the two rings that may bring the two discontinuities over each other.

BRIEF DESCRIPTION OF THE DRAWINGS

FIG. 2 is an exploded side plan view of the lower portion of a plunger which is a part of the device shown in FIG. 1.

FIGS. 3 and 4 are top plan views of rings used in the piston of FIG. 2.

FIG. 5 is an enlarged, partial, top view of a ring.

FIG. 6 is a sectional view taken along line 6-6 of FIG. 1.

DETAILED DESCRIPTION

Figure 1:
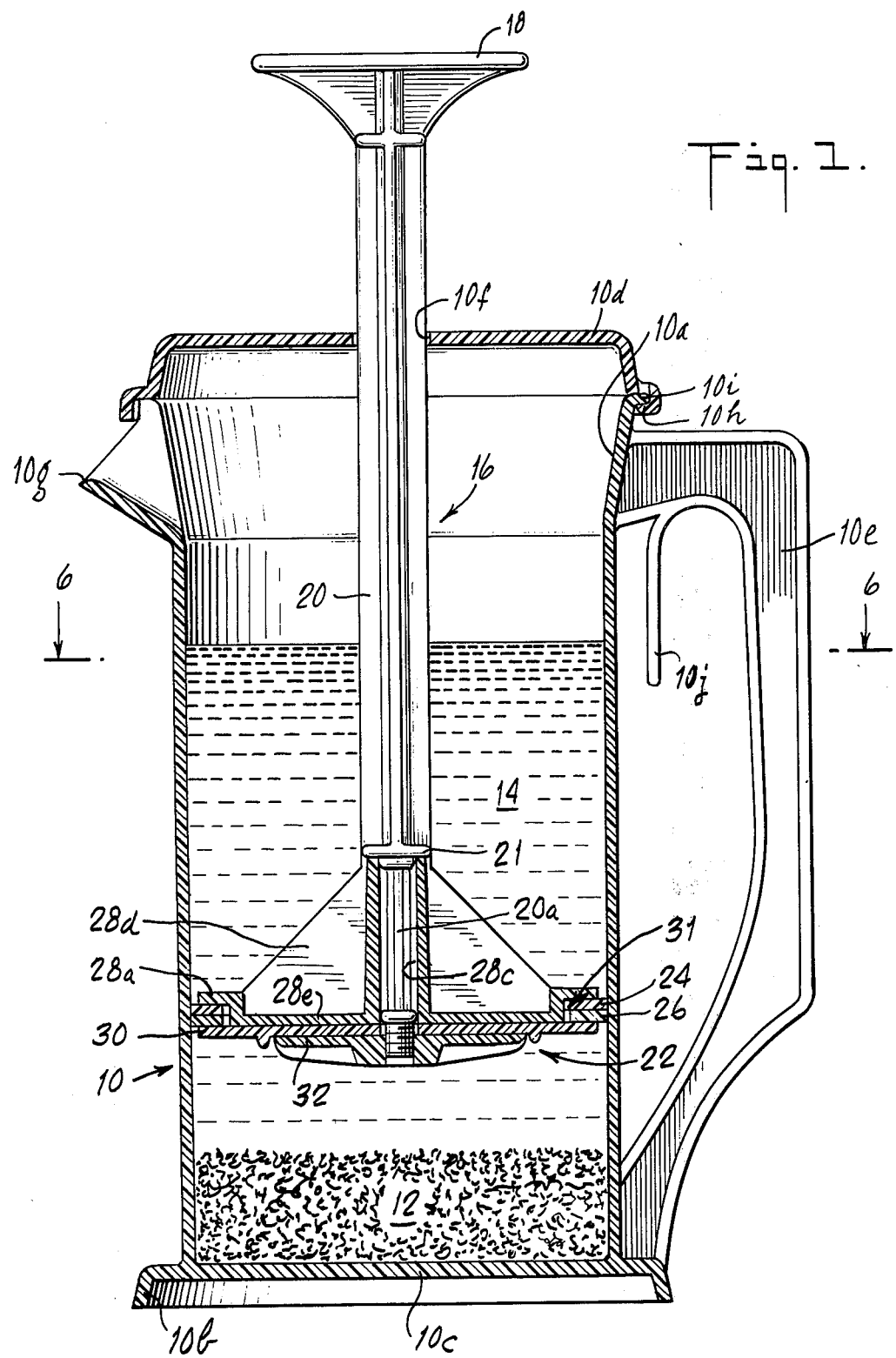
FIG. 1 is a longitudinal section of a beverage making device embodying the invention.

The illustrated embodiment of the invented beverage making device comprises an open top, tubular container 10 for holding a mixture of solid particles 12, such as coffee grounds, and a liquid infusion 14. A plunger 16, which has a handle 18 at its upper end and a downwardly extending shaft 20, has at its lower end a piston 22 which moves axially within the container 10. The piston 22 includes a pair of radially outwardly extending rings 24 and 26 whose outer circumferential edges approach the container 10, leaving a clearance between the container and the rings 24 and 26 over at least a portion of their outer circumferential edges which is generally sufficient for liquid flow between the container and the rings but insufficient for particle flow.

Thus, when the container 10 is filled with a mixture of solid particles 12, e.g., coffee grounds, and a liquid 14, e.g., coffee infusion resulting from pouring hot water over the coffee grounds, and the piston 22 starts moving doownwardly from the top of the container 10, the liquid 14 can flow between the inner wall of the container 10 and the outer circumferential edges of the rings 24 and 26, but the solid particles 12 remain below the piston 22. After the piston 22 has been pushed down as far as it can go, the solid particles 12 are under the piston 22, while only the liquid 14, free of solid particles 12, is above the piston 22 and can be poured out of the container 10.

Referring to FIGS. 1 and 2, the piston 22 comprises an upper holder 28 and a bottom holder 30 which are coaxial and are releasably held against each other to define an outwardly facing channel 31 holding the rings 24 and 26. This channel 31 is formed between the upper face of the lower holder 30, the lower face of a lip 28a of the upper holder 28 and a radially outward face 28b of the upper holder 28. When the piston 22 is assembled as shown in FIG. 1, by passing an extension 20a of the plunger shank 20 through a central opening 28c of the upper holder 28 and through a central opening 30a of the lower holder 30, and screwing a wing nut 32 onto the threaded lowermost part of the plunger shaft extension 20a, the facing surfaces of the lip 28a and the lower holder 30 are spaced from each other by a distance which is very slightly more than the axial thickness of the rings 24 and 26, so that the rings can move radially between the holders 28 and 30, and yet no particles 12 and at most an insignificant amount of liquid 14 can flow between the rings 24 and 26 on the one hand and the holders 28 and 30 on the other.

Referring to FIGS. 2 and 6, the upper holder 28 has a central annular base 28e integral with an upwardly extending central tube which has the opening 28c, and has four equidistantly spaced ribs 28d connecting the tube providing the opening 28c with the base 28e to stabilize the base and keep it from twisting or warping in use. The upper surface of the tube having the opening 28c bears against a land 21 of the shaft 20 when the piston 22 is assembled as shown in FIG. 1.

Referring to FIGS. 3 and 4, each of the rings 24 and 26 is annular, but is not a complete annulus; each of the rings has a discontinuity so that it is in fact C-shaped. Because of this discontinuity, each of the rings 24 and 26 can contract radially when squeezed, to bring the facing edges of the discontinuity closer to each other. When the rings 24 and 26 are in the assembled piston 22, their discontinuities are diametrically opposite, and an axial projection 24a from the ring 24 extends into the discontinuity of the ring 26, to prevent relative rotation between the rings 24 and 26 in the assembled piston 22.

Figure 9:
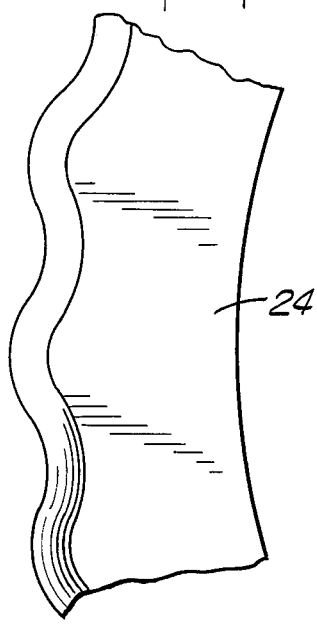
FIGS. 9 and 10 are enlarged, partial, top views of the rings of FIGS. 7 and 8, respectively.
Figure 7:
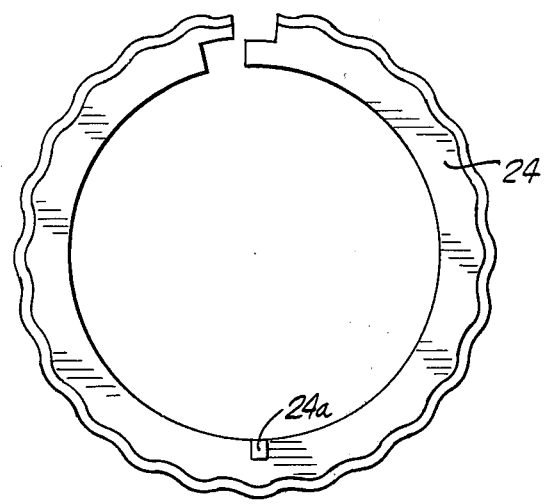
FIGS. 7 and 8 are top plan views of an alternate embodiment of the rings used in the piston of FIG. 2.
Figure 10:
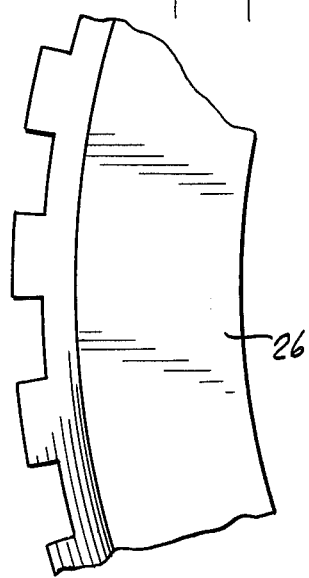
Figure 8:
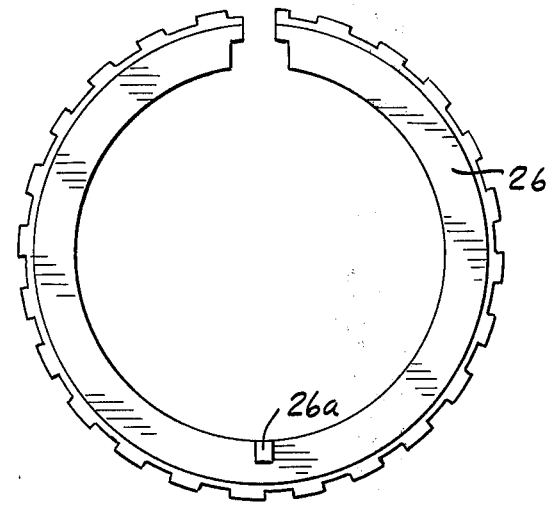
Figure 11:
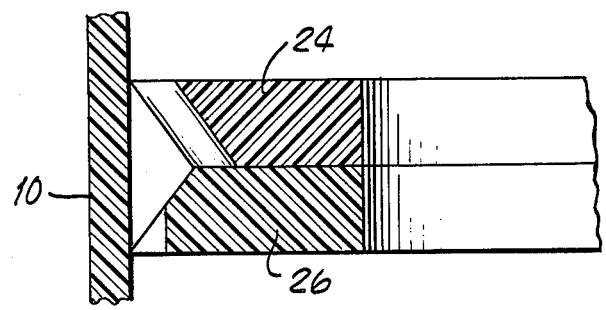
FIG. 11 is an enlarged, partial, side plan view of the rings shown in FIG. 1 incorporating the alternate embodiments of FIGS. 7 and 8.

Each of the rings 24 and 26 may have a serrated circumferential outer edge, as shown in the enlarged partial view of FIG. 5, to resemble the serrated edge of a coin. While the serrations must be sufficiently small to prevent the flow of solid particles 12, they still facilitate the flow of liquid 14. Alternately, the upper ring 24 may have a scalloped circumferential outer edge as shown in FIG. 7 and the enlarged, partial view of FIG. 9. The lower ring 26 may then have a notched circumferential outer edge as shown in FIG. 8 and the enlarged, partial view of FIG. 10. The circumferential outer surfaces of rings 24 and 26 may be tapered inwardly toward their common surfaces, as shown in FIG. 11, so that ring 24 makes contact with the sidewall of the container 10 only at its upper scalloped edge and the ring 26 similarly contacts the sidewall of the container only at its lower notched edge. The notches in ring 26 may be sufficiently large to permit at least some of the solid particles 12 to pass into the annular space defined by rings 24 and 26 and the sidewall of the container 10. The scallops on the outer circumferential edge of ring 24, however, are suitably dimensioned to substantially prevent the passage of solid particles across the ring-sidewall junction.

In operation, the plunger 16 is taken out of the container 10 and solid particulate material, such as coffee grounds 12, and a liquid 14, such as hot water, are poured into the container. After a suitable infusion period, typically a few minutes, the piston 22 is inserted from the top of the container 10 and is slowly pushed down. Note in FIG. 1 that the upper portion 10a of the container wall is funnel-shaped, flairing outwardly toward the top of the container, to facilitate insertion of the piston 22. Note also that the rings 24 and 26 are made of a resilient material, and that the diameter of each is typically somewhat greater than the inner diameter of the container 10 below the flaired wall 10a but somewhat less than the diameter of the top of the flaired portion 10a. As the piston 22 is slowly pushed down into the container portion below the flaired top wall 10a, the rings 24 and 26 are squeezed radially inwardly, with the facing edges of their discontinuities coming closer to each other, and with at least portions of the outer circumferential edge of each ring in contact with the inner wall of the container 10. Even if the rings 24 and 26 are not serrated, liquid 14 flows between the container wall and the rings 24 and 26, at least partly due to imperfections in the fit between the inner wall of the container 10 and the outer circumferential edges of the rings 24 and 26. However, with serrations of the type shown in FIGS. 3, 4 and 5, or FIGS. 7, 8, 9 and 10, the liquid flow between the container wall and the rings 24 and 26 is facilitated, and less effort is required to push down the piston 22.

As the piston 22 is pushed down through the mixture of liquid 14 and solid particulate material 12, the liquid 14 flows upwardly between the facing surfaces of the rings 24 and 26 on the one hand and the container 10 on the other hand. However, since the clearance between the outer circumferential edge of the rings 24 and 26 and the container 10 is too small for the particles of the material 12, the material 12 stays below the piston 22. Normally, the piston 22 is pushed all the way down until it comes to rest against the compacted mass of particulate material 12, before pouring out the liquid 14, although pouring out may start as soon as there is some liquid above the piston 22. In the alternate embodiment of FIG. 7 through FIG. 11, as the piston 22 is pushed down through the mixture of liquid 14 and solid particulate material 12, the liquid and perhaps some of the solid particulate material travels upwardly through the notches in ring 26. However, since the clearance between the outer scalloped circumferential edge of the ring 24 and the sidewall of the container 10 is too small for the particles of material 12 to pass, such material 12 remains in the annular space defined by the outer edges of tapered rings 24 and 26 and the sidewall of container 10. The liquid 14 passes between the scalloped edge of the ring 24 and the sidewall of the container 10 and into the upper portion of the container. In this manner, the solid material 12 that may have been trapped in the annular space serves as an additional filtering element to keep the remainder of the solid material 12 below the level of the piston 22. The scallops in ring 24 and the notches in ring 26 are not vertically aligned, so that the flow of liquid 14 through the rings 24 and 26 is not in a uniform upward direction. This permits the rate of flow to remain relatively uniform throughout the circumference of the rings even if some of the notches in ring 26 become clogged with larger particles of the solid material 12.

The entire beverage making device illustrated in these drawings may be made of a molded plastic material such as the material distributed by the General Electric Company under the trade name LEXAN. In order to facilitate the molding process, the container 10 may be made slightly tapered, so that it is not a perfect cylinder but is more like an inverted, truncated cone. This taper does not detract from the operation of the invented piston 22 since the rings 24 and 26 can contract radially due to their discontinuities as the piston 22 is pushed down the container 10. In fact, this taper is beneficial, because the biasing force of the rings against the container sidewall increases as the piston is pushed further down and the concentration of particulate material 12 under the piston 22 becomes greater.

The container 10 is supported by a downwardly extending annular flange 10b which raises the bottom wall 10c of the container to keep it from becoming unsteady in case the bottom wall 10c bulges out when hot liquid is poured in. The container has a handle 10e which is H-shaped in section, as seen in FIG. 6, for lightness and stability, and which has a guard 10j extending downwardly from the upper part of the handle and spaced away from the sidewall of the container 10, to prevent contact between a user grasping the handle 10e and the possibly hot sidewall of the container 10. Additionally, the container 10 has a removeable cover 10d having a central opening 10f which receives the plunger shaft 20 and stabilizes the plunger 16 radially as it is pushed down. As seen in FIG. 1, the cover 10d can remain in place on the container 10 while the liquid 14 is poured out through a spout 10g, which is below the cover 10d.

It should be clear that the principles of this invention are applicable to variations of the embodiment described above. For example: a single ring, or more than two rings may be used instead of the rings 24 and 26; the rings may not have serrated edges or other discontinuities; the device may be modified to operate by positioning the piston 22 at the bottom of the container 10, then pouring a mixture of solid particles 12 and liquid 14 into the container, and moving the plunger 16 axially upwardly, etc. It should also be clear that beverages other than coffee or tea may be made, such as liquids resulting from filtering the solid material from any mixture of solid and liquid (e.g. pulp resulting from crushing fruits or vegetables).

The disclosed device can be conveniently cleaned by taking the plunger 16 out of the container 10 and disassembling it by unscrewing the wing nut 32 so that the parts of the piston shown separately in FIG. 2 can be washed separately. Since no wire mesh or screen filters are used, there is no possibility of clogging of small passages, as with some prior art devices of this type. In order to insure that the rings 24 and 26 in FIG. 7 and FIG. 8 are properly reassembled on the piston, these rings may be provided with axial projections, 24a and 26a respectively, located opposite their discontinuities. These projections serve to locate the discontinuities in the rings as previously discussed, and additionally, to prevent the rings from being improperly assembled. When the rings are properly assembled, with their smaller diameter faces adjacent, the projection 24a of ring 24 will fit into the discontinuity in ring 26, and the projection 26a on ring 26 will similarly fit into the discontinuity in ring 24. If the rings are assembled in any other manner, the projections will not mate properly with the discontinuities, thus causing an unsymmetrical appearance in the assembled piston which will alert the user and indicate that reassembly is necessary.

To permit cover 10d to remain securely in place on the container 10 while the liquid 14 is poured, the upper rim of the container is provided with projections 10h. When projections 10h are engaged in notches 10i in the cover, the cover is securely fastened to the container to permit proper alignment of its central opening 10f and to prevent hot liquid from spilling when it is poured.

I claim:

1. A beverage maker comprising: a container for a mixture of solid particles and a liquid, said container having an axially extending, tubular sidewall; a piston means for moving said piston axially within the container; a first solid ring and means for securing the first ring to the piston for axial movement therewith within the container, with the first ring being in the plane transverse to the axis of the container, said first solid ring contacting only a part of the circumference of the container sidewall and being inwardly spaced from the remainder of the sidewall circumference throughout said axial movement of the piston, said first ring and the sidewall adjacent thereto defining therebetween a first clearance which allows said liquid to flow therethrough but is smaller in size than the solid particles which are over a first selected size; a second solid ring and means for securing the second ring to the piston adjacent to and coaxially with the first ring in a plane transverse to said axis for axial movement therewith within the container, said second solid ring contacting only a part of the container sidewall circumference and being spaced inwardly from the remainder of the sidewall circumference, said second ring and the sidewall adjacent thereto defining a second clearance which allows said liquid to flow therethrough but is smaller in size than the solid particles which are larger than a second selected size; whereby when the piston is moved axially within the container through the mixture therein the liquid flows through said first and second clearances into the container portion behind the rings as viewed in the direction of piston movement but the solid particles over said first selected size are kept ahead of the rings.

2. A beverage maker as in claim 1 wherein each of said rings is C-shaped, with a gap between two facing ends, and including means for maintaining the two rings with the gaps thereof spaced circumferentially from each other and for preventing relative rotation between the rings.

3. A beverage maker as in claim 2 wherein the outer circumferential edge of each of the first and second solid rings has a circumferential row of projecting portions contacting the container sidewall and spaced from each other by indentations which are spaced inwardly from the sidewall and are smaller than said particles of said first and second selected sizes respectively, said indentations of the first and second ring forming said first and second clearance respectively.

4. A beverage maker as in claim 3 wherein the outer circumferential surface of each ring tapers inwardly toward the other ring and the tapered surfaces form an annular channel which is substantially triangular in axial section and is adjacent to and faces the container sidewall with the open side thereof.

5. A beverage maker as in claim 4 wherein the container tapers progressively inwardly in the direction of said axial movement of the piston, and the gaps in the rings are greater than the difference between the container diameters at the ends of the axial movement to allow thereby for radially inward compression of the rings as the piston proceeds in said axial movement within the container and the size of the ring gaps is thereby progressively reduced.

6. A beverage maker as in claim 2 wherein the outer circumferential edge of each of the rings is serrated and the space between the serrations and the adjacent container sidewall defines said clearances.

7. A beverage maker as in claim 2 wherein the outer circumferential edge of one of the rings is serrated and has angular notches and the outer circumferential edge of the other ring is scalloped.

8. A beverage maker as in claim 1 wherein the outer circumferential edge of each of the rings is serrated and the spaces between the serrations and the adjacent container sidewall define said clearances.

9. A beverage maker as in claim 1 wherein the first ring is ahead of the second ring in the direction of piston movement and said first selected size is greater than said second selected size, whereby solid particles which are greater than said second selected size are allowed to pass through said first clearance as the piston moves axially through the container but are not allowed to pass through said second clearance.

10. A device for filtering solid particulate material from a liquid comprising: a container for the liquid and the solid particulate material, said container having an axially extending, tubular sidewall; a piston means for moving said piston axially within the container; a first solid ring which is secured to the piston in a plane transverse to the container axis and whose outer circumferential edge has radially extending projecting portions which contact the container sidewall and are circumferentially spaced from each other by indentations spaced inwardly from the container sidewall to form thereby a first clearance between the sidewall and the first ring which allows flow of said liquid therethrough but is smaller than a first selected particle size of said solid particulate material, said first ring being C-shaped, with a gap between the two circumferentially facing edges; whereby when the piston is moved axially in the container said liquid passes through said clearance but the solid particulate material over said first selected size does not and remains ahead of the first ring in the direction of said axial movement.

11. A device as in claim 10 including a second solid ring and means for securing the second ring to the piston coaxially with and adjacent and substantially parallel to the first solid ring for axial movement therewith within the container, said second solid ring having an outer circumferential edge with projecting portions which contact the container side wall and are spaced circumferentially from each other by indentations spaced inwardly from the container sidewall to define a second clearance between the container sidewall and the outer circumferential edge of the second ring, said second clearance allowing said liquid to flow therethrough but being smaller than the particles of said solid particulate material which are over a second selected size.

12. A device as in claim 11 wherein said second solid ring is C-shaped, with a gap between the two circumferentially facing edges and including means for preventing relative rotation between the two rings.

13. A device as in claim 11 wherein the outer circumferential surface of each ring is tapered inwardly toward the other ring and said tapered surfaces define a channel facing the container sidewall, and wherein the first ring is ahead of the second ring as seen in the direction of axial movement of said piston and the first clearance is greater in size than the second clearance to allow into said channel particles which can not pass through the second clearance.

14. A beverage brewing device for making a liquid infusion from a particulate material comprising particles exceeding a selected size and a liquid, said device having an axially extending, tubular container for said particulate material and liquid and a plunger axially moveable therein and having an upper and a lower end, a piston secured at the lower end of the plunger, a pair of solid, annular inserts mounted parallel to each other on said piston and extending radially outwardly from at least a major portion thereof, said inserts contacting portions of the circumference of the container sidewall and spaced inwardly from the remaining portions thereof to form thereby a liquid-permeable filter at the clearance between the container sidewall and the insert portions spaced inwardly therefrom, the clearances between the inserts and the container sidewall which form said filter being of a size which allows the liquid infusion to flow therethrough but prevents at least a major portion of the particulate material from flowing therethrough when said piston is moved axially within the container.

15. A device as in claim 14 wherein the piston comprises two plates conforming in shape to a section of the container transverse to said axis and disposed coaxially at the lower end of the plunger and a flange which extends axially from one plate to the other and has a diameter smaller than the inside diameter of the annular inserts, said plates and flange defining a radially outwardly facing, annular, circumferential channel, and wherein the annular inserts are mounted on said piston in said channel and comprise a pair of solid rings having radially outer edges which are serrated.

16. A device as in claim 14 wherein the annular insert comprises a first ring having a serrated outer circumferential edge and a second ring having a serrated outer circumferential edge and disposed adjacent to and coaxially with the first ring.

17. A plunger for a beverage making device comprising: a rod having a first end and a second end; a handle connected to the first end of said rod; a piston connected to the second end of the rod; and a pair of annular, solid inserts mounted on said piston, extending radially outwardly from at least a major portion thereof and having radially outer circumferential edges which are formed with circumferential rows of projecting portions spaced circumferentially from each other by indentations extending radially inwardly and having a selected size.

18. A plunger as in claim 17 wherein the second end of the rod comprises a threaded shaft, said piston comprises two plates mounted in a parallel relationship on the threaded shaft and a flange extending axially from one plate to the other to form thereby an outwardly facing, annular, circumferential channel, and wherein said annular inserts are mounted in said channel and comprise at least one flat, solid ring having a serrated outer circumference.

19. A plunger as in claim 18 wherein the ring is split and the split ends thereof are circumferentially spaced from each other to allow the ring to decrease in diameter in response to an inward radial pressure.

20. A device for filtering solid particulate material from a liquid comprising: a container for the liquid and the solid particulate material, said container having an axially extending, tubular sidewall; a piston means for moving said piston axially within the container; a first ring which is secured to the piston in a plane transverse to the container axis and whose outer circumferential edge has radially extending projecting portions which contact the container sidewall and are circumferentially spaced from each other by indentations spaced inwardly from the container sidewall to form thereby a first clearance between the sidewall and the first ring which allows said liquid to flow therethrough but is smaller than a first selected particle size of said solid particulate material; and a second ring which is secured to the piston in a plane transverse to the container axis and whose outer circumferential edge has radially outwardly extending tips which contact the container sidewall and are circumferentially spaced from each other by indentations spaced radially inwardly from the container sidewall to form thereby a second clearance between the sidewall and the first ring which allows said liquid to flow therethrough but is smaller than a second selected particle size of said solid particulate material; whereby when the piston is moved axially in the container said liquid passes through said clearance but the solid particulate material over said first selected size does not and remains ahead of the rings in the direction of said axial movement; and wherein the first ring is C-shaped, with a gap between two facing ends.

* * * * *